US012755249B2

(12) United States Patent
Lifferth et al.

(10) Patent No.: US 12,755,249 B2
(45) Date of Patent: Oct. 6, 2026

(54) AUTOMATED RECRUITMENT MANAGEMENT METHOD AND SYSTEM USING AN AI-BASED CANDIDATE TRANSPARENT PROGRESS TRACKER

(71) Applicant: OBRA INC., South Jordan, UT (US)

(72) Inventors: Robb Lifferth, Farmington, UT (US); Paul Ahlstrom, Sandy, UT (US)

(73) Assignee: OBRA INC, South Jordan, UT (US)

( * ) Notice: Subject to any disclaimer, the term of this patent is extended or adjusted under 35 U.S.C. 154(b) by 410 days.

(21) Appl. No.: 17/736,633

(22) Filed: May 4, 2022

(65) Prior Publication Data

US 2023/0360000 A1 Nov. 9, 2023

(51) Int. Cl.

*G06Q 10/10* (2023.01)
*G06Q 10/0631* (2023.01)
*G06Q 10/1053* (2023.01)
*G06Q 10/107* (2023.01)

(52) U.S. Cl.

CPC . *G06Q 10/1053* (2013.01); *G06Q 10/063112* (2013.01); *G06Q 10/107* (2013.01)

(58) Field of Classification Search

CPC ........................................... G06Q 10/00–90/00
See application file for complete search history.

(56) References Cited

U.S. PATENT DOCUMENTS

| | | | | |
|---|---|---|---|---|
| 11,727,327 | B2 * | 8/2023 | Inamdar | G06N 20/00 705/7.14 |
| 2011/0276507 | A1 * | 11/2011 | O'Malley | G06Q 10/00 705/321 |
| 2015/0193737 | A1 * | 7/2015 | Jadia | G06Q 10/1053 705/80 |
| 2019/0197486 | A1 * | 6/2019 | Jersin | G06Q 10/1053 |
| 2019/0251516 | A1 * | 8/2019 | Champaneria | G06Q 10/1053 |

* cited by examiner

*Primary Examiner* — Arif Ullah
(74) *Attorney, Agent, or Firm* — Ballard Spahr LLP

(57) ABSTRACT

A method and a system are disclosed for providing an Artificial Intelligence (AI) based recruitment management, the method comprising. An AI-based tracker module having a graphical user interface is configured for receiving a plurality of job applications from a plurality of candidates via respective user devices. The tracker is configured to predict the hiring probability of a candidate based on: a compensation viability score, a speed score, a skill sets of the candidate. The tracker is further configured to predict time to fill a position by the candidate, based on one or more parameters including location, salary, and skill set.

14 Claims, 5 Drawing Sheets

AUTOMATED RECRUITMENT MANAGEMENT METHOD AND SYSTEM USING AN AI-BASED CANDIDATE TRANSPARENT PROGRESS TRACKER

FIELD OF THE DISCLOSURE

The present invention relates to recruitment management, and more particularly to computer implemented automated method and system for facilitating hiring and placement management by configuring a candidate transparent progress tracker.

BACKGROUND OF THE DISCLOSURE

Management of recruitment processes involves employers, recruiting agents, managers and jobseekers, wherein best fit candidates or job seekers are identified by their recruiting managers and are given suitable positions in respective organizations. Recruitment processes at many times may become time consuming due to the various steps such as advertising, job-posting, searching for the right candidates by the employers, screening several resumes of several candidates, interviewing selected candidates, and eventually recruiting best-fit candidates for the jobs. Also, many of these steps are manually conducted and hence the recruiters as well as job seekers are unable to track the status of any given job applications in real time.

The conventional process of collecting related data and information from the candidates or the jobseekers, and subsequently screening candidates based on a plurality of parameters is inefficient and subject to human error and rely on subjective decisions in many cases. It may also be difficult to identify the candidates that are best-fit or best match for a given employer. These and other problems exist with conventional systems and methods for candidate reviewing and selection systems. Candidates are also unaware of the status of their job application as there is no immediate response or feedback given by the employers and/or recruiting managers.

In view of the above, the present subject matter as disclosed herein, aims to provide an AI-based platform for facilitating automated hiring and placement management and enabling the candidates to track the status of their job applications in real time.

SUMMARY OF THE DISCLOSURE

In order to provide a holistic solution to the above-mentioned limitations, it is necessary to provide a platform for facilitating automated hiring and placement management.

An object of the present disclosure is to provide an Artificial Intelligence (AI) based Candidate Transparent Progress Tracker (CTPT) or a tracker module to track the progress of the job applications by the recruiters and job-seekers.

Another object of the present disclosure is to provide real time updates and to generate a feedback loop to both recruiters and jobseekers involved in hiring and recruitment process.

Yet another object of the present disclosure is to communicate feedback to each participant involved providing status updates for the role itself by comparing to the current and historic marketing data.

Yet another object of the present disclosure is to operate the candidate transparent progress tracker on a plurality of levels including candidate level, position member level, and position level.

According to an embodiment of the present disclosure, there is provided a system for providing an Artificial Intelligence (AI) based recruitment management, the system comprising: a plurality of user devices, each of the plurality of user devices operating, via a server, an AI-based tracker module having a graphical user interface and is configured to: receive a plurality of job applications from a plurality of candidates via respective user devices; calculate a compensation viability score (CVS score) for each of the received job applications to determine a compensation range for a particular job position; analyse at least one job application of the received plurality of job applications, in an event the calculated CVS score is within the compensation range; calculate continuously, a speed score and a probability of hiring, each corresponding to the at least one job application being analysed; assign one or more skill sets to the at least one job application being analysed; schedule one or more interviews of the candidate to be conducted by at least one hiring manager; update the one or more skill sets of the at least one job application based on each of the one or more interviews conducted; and fill the job position by hiring the candidate based on the updated skill scores.

According to an embodiment of the present disclosure, a smart search engine powered by machine learning, the smart search engine configured to search for potential jobs for the candidate based on the assigned skill set.

According to an embodiment of the present disclosure, a data repository is configured to store user profile data, job profile data and industry profile data.

According to an embodiment of the present disclosure, the AI-based tracker module is further configured to send an automated email to the candidate in an event of rejection.

According to an embodiment of the present disclosure, the compensation viability score (CVS) is calculated based on the candidate's indicated salary.

According to an embodiment of the present disclosure, the one or more skill sets include a skilled and experience score (SES), and a people, ethics & culture soft skills (PECS).

According to an embodiment of the present disclosure, the tracker module is further configured to calculate the SES score by obtaining the highest salary expectation match among all active candidates and calculate the distance between the candidate and the highest salary expectation match.

According to an embodiment of the present disclosure, the tracker module is further configured to calculate the PECS score, by getting highest PECS match, among all active candidates and calculate the distance between the candidate and highest PECS match.

According to an embodiment of the present disclosure, the tracker module is further configured to calculate the speed score (SPD) that measures the movement speed with which the candidate moves from one designation phase to another.

According to an embodiment of the present disclosure, the tracker module is further configured to assign a higher speed score to the candidate, in the event the candidate moves faster than other candidates.

According to an embodiment of the present disclosure, the tracker module is configured to determine the probability of hiring a candidate by calculating an average of a sum of SES, PECS, CVS and SPD.

According to an embodiment of the present disclosure, the tracker module is configured to determine the probability of hiring a candidate based on corresponding wights assigned against each of the SES, PECS, CVS and SPD by the at least one hiring manager According to an embodiment of the present disclosure, the tracker module is configured to predict time to fill a position by a candidate, based on one or more parameters including location, salary, and skill set.

According to an embodiment of the present disclosure, a method for providing an Artificial Intelligence (AI) based recruitment management is disclosed. The method comprises: configuring a plurality of user devices, each of the plurality of user devices operating, via a server, an AI-based tracker module having a graphical user interface and is configured for: receiving a plurality of job applications from a plurality of candidates via respective user devices; calculating a compensation viability score (CVS score) for each of the received job applications to determine a compensation range for a particular job position; analysing at least one job application of the received plurality of job applications, in an event the calculated CVS score is within the compensation range; calculating continuously, a speed score and a probability of hiring, each corresponding to the at least one job application being analysed; assigning one or more skill sets to the at least one job application being analysed; scheduling one or more interviews of the candidate to be conducted by at least one hiring manager; updating the one or more skill sets of the at least one job application based on each of the one or more interviews conducted; and filling the job position by hiring the candidate based on the updated skill scores.

The afore-mentioned objectives and additional aspects of the embodiments herein will be better understood when read in conjunction with the following description and accompanying drawings. It should be understood, however, that the following descriptions, while indicating preferred embodiments and numerous specific details thereof, are given by way of illustration and not of limitation. This section is intended only to introduce certain objects and aspects of the present invention, and is therefore, not intended to define key features or scope of the subject matter of the present invention.

BRIEF DESCRIPTION OF THE DRAWINGS

The figures mentioned in this section are intended to disclose exemplary embodiments of the claimed system and method. Further, the components/modules and steps of a process are assigned reference numerals that are used throughout the description to indicate the respective components and steps. Other objects, features, and advantages of the present invention will be apparent from the following description when read with reference to the accompanying drawings:

Like reference numerals refer to like parts throughout the description of several views of the drawings.

DETAILED DESCRIPTION OF THE DISCLOSURE

Figure 1:
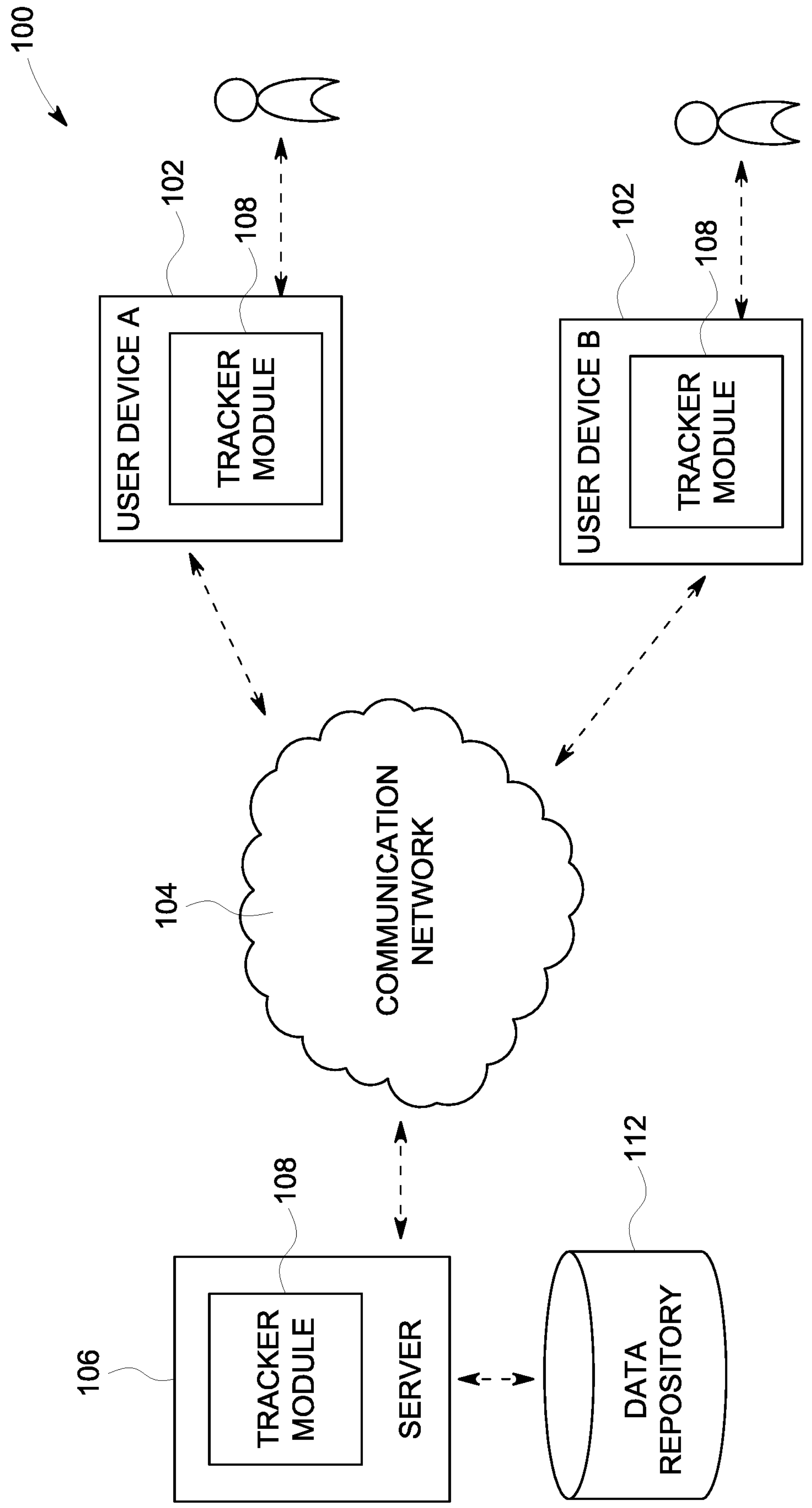
FIG. 1 illustrates a system architecture, according to an exemplary embodiment of the invention disclosure.

This section is intended to provide explanation and description of various possible embodiments of the present invention. The embodiments used herein, and various features and advantageous details thereof are explained more fully with reference to non-limiting embodiments illustrated in the accompanying drawings and detailed in the following description. The examples used herein are intended only to facilitate an understanding of ways in which the embodiments herein may be practiced and to further enable the person skilled in the art to practice the embodiments used herein. Also, the examples/embodiments described herein should not be construed as limiting the scope of the embodiments herein. Corresponding reference numerals indicate corresponding parts throughout the drawings.

The present invention discloses an Artificial Intelligence (AI) based recruitment management by configuring a Candidate Transparent Progress Tracker (CTPT) or a tracker module having a graphical user interface. The AI-based tracker module is configured to predict the hiring probability of a candidate based on: a compensation viability score (CVS score), a speed score, a skill sets of the candidate. The tracker is further configured to predict time to fill a position by the candidate, based on one or more parameters including location, salary, and skill set.

As used herein, 'AI-module' is an artificial intelligence enabled device or module, that is capable of processing digital logics and also possesses analytical skills for analyzing and processing various data or information, according to the embodiments of the present invention.

As used herein, 'data repository' refers to a local or remote memory device; docket systems; storage units; databases; each capable to store information including, voice data, speech to text transcriptions, customer profiles and related information, audio feeds, metadata, predefined events, call notes, etc. In an embodiment, the storage unit may be a database server, a cloud storage, a remote database, a local database.

As used herein, 'user device' is a smart electronic device capable of communicating with various other electronic devices and applications via one or more communication networks. The user device comprises: an input unit to receive one or more input data; an operating system to enable the user device to operate; a processor to process various data and information; a memory unit to store initial data, intermediary data and final data; and an output unit having a graphical user interface (GUI).

As used herein, 'module' or 'unit' refers to a device, a system, a hardware, a computer application configured to execute specific functions or instructions according to the embodiments of the present invention. The module or unit may include a single device or multiple devices configured to perform specific functions according to the present invention disclosed herein.

Terms such as 'connect', 'integrate', 'configure', and other similar terms include a physical connection, a wireless connection, a logical connection or a combination of such connections including electrical, optical, RF, infrared, Bluetooth, or other transmission media, and include configuration of software applications to execute computer program instructions, as specific to the presently disclosed embodiments, or as may be obvious to a person skilled in the art.

Terms such as 'send', 'transfer', 'transmit' and 'receive', 'collect', 'obtain', 'access' and other similar terms refers to transmission of data between various modules and units via wired or wireless connections across a network. The 'network' includes a local area network (LAN), a wide area network (WAN), a metropolitan area network (MAN), a virtual private network (VPN), an enterprise private network (EPN), Internet, cloud-based network, and a global area network (GAN).

FIG. 1 illustrates architecture of a computer-implemented system 100 for automatically managing recruitment process of a candidate. The system 100 comprises a plurality of user devices 102, each of the plurality of user devices 102 operating, via a server 106, an AI-based tracker module 108 (herein after 'tracker module 108') having a graphical user interface. A data repository 112 may be associated with the server 106. The plurality of user devices 102 are connected to the server 106 across communication network 104. The plurality of user devices 102 include 'user device A' and 'user device B' are associated with a plurality of candidates and at least one recruiter. A repository 112 is also configured to store user profile data, job profile data and industry profile data.

According to an embodiment of the present disclosure, each of the plurality of user devices 102 operate, via a server 106, the tracker module 108. The tracker module 108 is configured to receive a plurality of job applications from a plurality of candidates via respective user devices 102. For each of the received job applications, a compensation viability score (CVS score) may be calculated by the tracker module 108 to determine a compensation range for a particular job position applied by a candidate. At least one job application of the received plurality of job applications, is then analysed by the tracker module 108 if it is determined that its corresponding CVS score is within the compensation range. The compensation viability score (CVS) is calculated based on the candidate's indicated salary. Thereafter, a speed score and a probability of hiring are calculated continuously. Each of the speed score and the probability of hiring being calculated corresponds to the at least one job application being analysed. The tracker module 108 thereafter assigns one or more skill sets to the at least one job application being analysed, and schedule one or more interviews of the candidate to be conducted by at least one hiring manager. The one or more skill sets of the at least one job application is updated based on each of the one or more interviews conducted. The job position is filled by hiring the candidate based on the updated skill scores. A smart search engine powered by machine learning, may be configured to search for potential jobs for the candidate based on the assigned skill set.

The tracker module 108 may include an AI module with machine learning capabilities. The AI module may be communicatively connected to the server 106 and the data repository 112 that facilitates in storing a plurality of predefined events, data and information pertaining to recruitment management process. Further, keywords from the resumes of the candidates may be extracted and analysed to identify the skill set of a candidate. The tracker module 108 flags the candidates with tags according to their professional skill sets and the smart matching engine uses the skill set references to look out for potential jobs that matches the skill set of a particular candidate. Anytime a candidate or a recruiter verifies more information, the AI/ML component of the tracker module 108 refines the data and accordingly the prediction of getting hired becomes more accurate for a candidate over a period of time. The one or more skill sets include a skilled and experience score (SES), and a 'people, ethics & culture soft skills' (PECS).

According to an embodiment of the present disclosure, the tracker module 108 is further configured to calculate the SES score by obtaining the highest salary expectation match among all active candidates and calculate the distance between the candidate and the highest salary expectation match. The tracker module 108 is further configured to calculate the PECS score, by getting highest PECS match, among all active candidates and calculate the distance between the candidate and highest PECS match. The tracker module 108 is further configured to calculate the speed score (SPD) that measures the movement speed with which the candidate moves from one designation phase to another. The probability of hiring a candidate is determined by the tracker module 108 by calculating an average of a sum of SES, PECS, CVS and SPD. The tracker module 108 is further configured to assign a higher speed score to the candidate, in the event the candidate moves faster than other candidates. According to an embodiment of the present disclosure, the tracker module is configured to determine the probability of hiring a candidate based on corresponding wights assigned against each of the SES, PECS, CVS and SPD by the at least one hiring manager. The tracker module 108 may be configured to calculate the average of the sum of SES, PECS, CVS and SPD scores as a default option. In addition, the tracker module 108 may also assign weights to each of the SES, PECS, CVS and SPD for a given candidate. The different weights may be assigned depending upon the importance or priority set by the hiring manager.

As disclosed above, the tracker module 108 may include an AI module with machine learning capabilities to keep learning with each candidate, the data that is gathered throughout the process and thereby to improve accuracy of the prediction by the tracker module 108. The tracker module 108 is configured to gather data in the following ways.

The tracker module 108 creates Similar Position Comparisons (SPC) based on job variables like SES, CVS, geographical locations, and other factors. The SPCs allow the tracker module 108 to create a baseline of relative market data to compare the newly opened positions to past "like positions." Each time when more positions open up, it may provide additional data to add more granularity to the process for each role that can be broken down by any variety of factors including company demographics (revenue, employee count, private, public); hiring manager variables (engaged, unengaged, biases, etc.); recruiter proficiencies scores; and candidate volume levels as they compare against actual volumes.

Further, the tracker module 108 is configured to record the duration for which the candidate is in each phase. This duration may be outlined as 'Speed'. This creates a baseline for how fast a candidate can expect to be in each phase and the likelihood of a successful outcome as that calculation changes. The Speed allows the tracker module 108 to create a baseline of relative market data as it relates to both SPC and the candidate data within the SPCs. As the platform has more positions added, it provides additional data to add more granularity to the process for each role that can be broken down by any variety of factors as mentioned above.

Furthermore, the tracker module 108 is configured to track data of hiring managers to help create a baseline to establish a 'Hiring Manager Engagement' score (HME). Hiring managers are the largest variable in the hiring process. Tracking the variability of successful and unsuccessful hires to find commonalities creates the opportunity to give a feedback loop to hiring managers to improve their chances of hiring successfully. As the platform has more positions added, it provides additional data to add more granularity to the process for each hiring manager that can be broken down by any variety of factors including company demographics (revenue, employee count, private, public); role type; recruiter proficiencies scores; and candidate volume levels as they compare against actual volumes.

The tracker module 108 tracks hygiene data such as compensation, perks, and benefits and how they compare against comparable alternatives, both in SPC and other alternatives such as gig economy roles. The tracker module 108 may also be configured to track the timing of data in the event that a role changes against its original post to see how it compares against SPCs.

Figure 2:
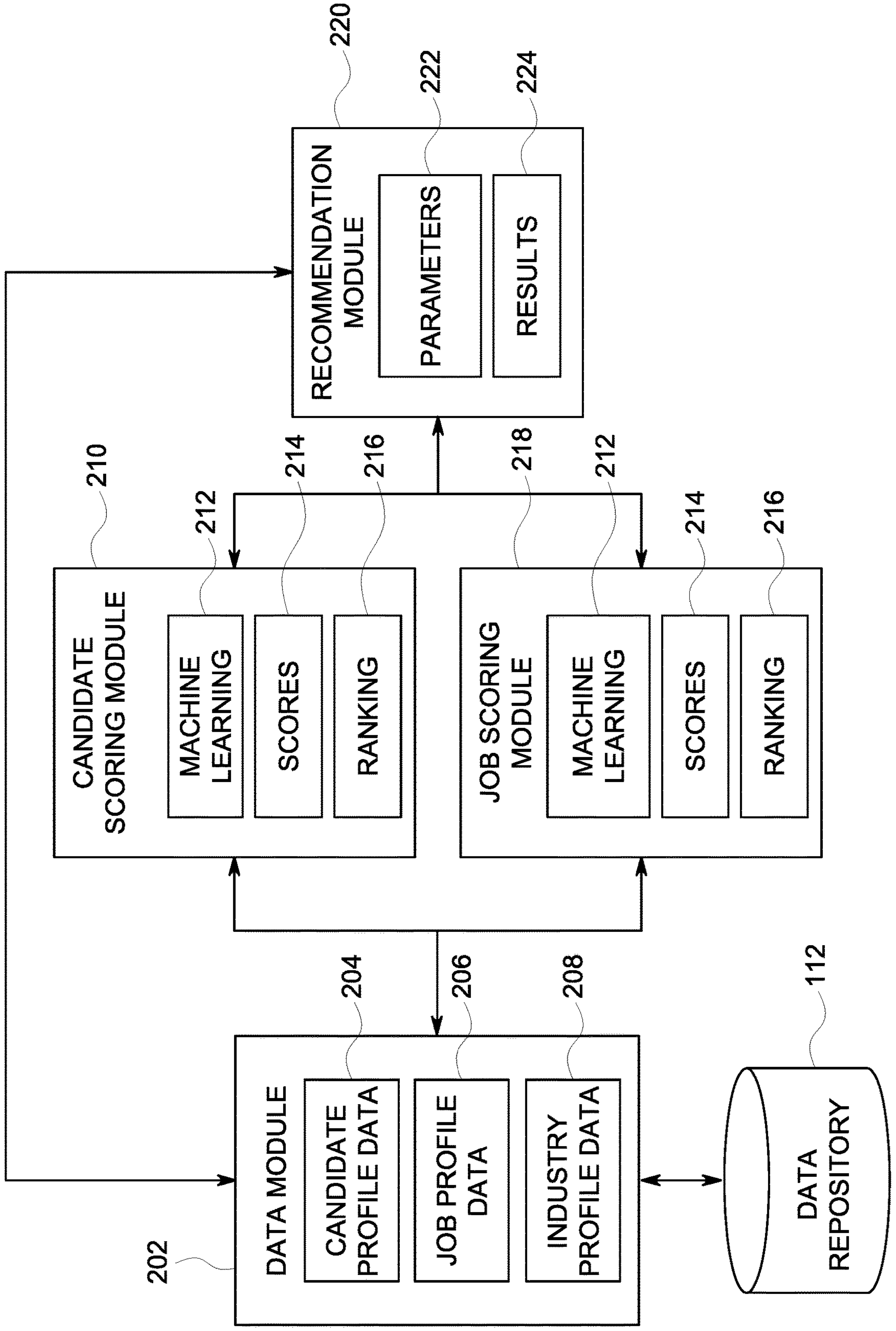
FIG. 2 illustrates various elements of tracker module, according to an exemplary embodiment of the present invention disclosure.

FIG. 2 illustrates various elements of the tracker module 108, according to an exemplary embodiment of the present invention disclosure. The various elements of the tracker module 108 include a data module 202, a candidate scoring module, a job scoring module, and recommendation module. The various elements of the tracker module 108 are communicatively associated with the data repository 112 which store various data and information pertaining to the management of recruitment of a candidate. The tracker module 108 operates on three levels including: candidate, position member, position level, including position health score.

The data module 202 is configured to generate candidate profile data 204, job profile data 206, and industrial profile data 208. The candidate profile data 204 may include, for example, name and contact details of all candidates who are registered to use the tracker module 108 the candidate profile data 204 also includes resume of the respective candidates. The job profile data 206 may include, for example, details of various job positions, job types, job location etc. the industry profile data may include for example profile of the companies and recruiters who are registered to use the tracker module 108 for hiring a candidate. Further, prediction of time to fill a position by a candidate, based on one or more parameters 222 including location, salary, and skill set may also be determined.

The candidate scoring module 210 has machine learning 212 capabilities to have calculate scores for various candidates according to their profile for respective jobs. the candidate scoring module 210 is also configured to assign ranking 216 to various candidates based on the scores 214 calculated. As explained above, the probability of hiring a candidate is determined based an average of a sum of SES, PECS, CVS and SPD scores and also on the weights assigned to the SES, PECS, CVS and SPD.

Similarly, the job scoring module 218 is configured with machine learning 212 capabilities to calculate the scores 214 and ranking 216 with respect to a job position. The recommendation module 220 is configured to define one or more parameters 222 and predict the hiring probability results 224 offer candidates. Based on the calculated scores 214 by the candidate scoring module 210 and the job scoring module 218, the recommendation module 220 provides recommendation to the have candidates and recruiters.

The candidate scoring module 212 is configured to calculate skills and experience scores that is SES scores. To calculate this score for a given candidate, best suited candidate is chosen among all active candidates and the distance between the given candidate and the best suited candidate is calculated. in an employment of the president disclosure the distance between the given candidate and the best suited candidate is calculated using the following formula, wherein 'SE' or "salary expectation" is the input provided to the tracker module 108 by the candidate with respect to the expected salary by the candidate. In the event of similar candidates scoring within a certain percentage to be a 'successful hired candidate', the salary expectation may be calculated as a potential tie-breaker.

$$SES = \frac{SE}{\max(f(x):x = SE1 \ldots SEn)} * 100$$

As used herein, 'People, Ethics and Culture' score (PCS) measures "soft skills" variables such as predetermined company values, ethics evaluations, and company culture valuations to calculate the likelihood of a candidate's advancement or hire.

The PECS score is calculated by the candidate scoring module. To calculate this score, highest PEC match is identified among all the active candidates by the tracker module 108. further, the distance between the given candidate and the highest PEC match may be calculated using the following formula.

$$PECS = \frac{PEC}{\max(f(x):x = PEC1 \ldots PECn)} * 100$$

Furthermore, compensation viability score may be calculated based on salary score of the given candidate. The salary score may be calculated by using following formula:

$$SAL = \frac{C - S}{C - O} * 100$$

Where,

Maximum Compensation+15%=C

Minimum Compensation+20%=O

Salary Expectation=S

According to an embodiment of the present subject matter, CVS Offer given candidate will be automatically set to 'zero' if more skilled candidates are identified with a lower salary expectation.

Thus, a candidate's final score is related to the score of all applicants in the same group and standardize to the highest one in the group. Once the salary score of the candidate is identified the CVS may be calculated as follows $$CVS = \frac{SAL}{\max(f(x):x = SAL1 \ldots SALn)} * 100$$

As used herein, 'speed' is an input that is a measurement of time window between a candidate's phase changes, which indicates interest or urgency of a hiring manager or recruiter. Measuring this indication is the key to preventing abandonment or lack of response to a candidate's application. The movement speed score (SPD measures the movement speed, in which a candidate moves from one designation(phase). The SPD school may also indicate a sign of urgency or interest of a candidate for a particular job position or opening. This movement can be due to the number of pooled candidates, urgency or interest of the hiring manager, or quality of the candidate's application, as well as other variables. If a candidate moves along the pipeline faster than other candidates, they are scored higher. Further, timer calculations are triggered when the candidate reaches the evaluated status for a more realistic score. Thus, the speed may be calculated using following formula, $$SPPED = \frac{TIME}{DISTANCE}$$

Where,

The delta (in minutes) between Now and the Evaluation Date=TIME

Non-Rejected Phase Order=DISTANCE

Once the SPEED is calculated, it may be compared against the rest of the candidates disputing for the job. The SPD score may be normalized by using the formula as follows;

$$SPD = \frac{SPEED}{\max(f(x):x = SPEED1 \ldots SPEEDn} * 100$$

Further, the probability of hiring a candidate may also be dependent upon external factors such as hiring manager biases, position variables, company compensation strategies and preferences, and other outside factors. Based on the examples shown below, in Example #1, 'Candidate C' (with probability 81%) is most likely to get hired as there is no external influences or factors or weights that will affect the hiring decisions by the recruiters. On the other hand, in Example #2, 'Candidate B' is most likely to get hired (Probability of Hiring [PH]=84%) because of the scoring weight (50%) on People, Ethics, and Culture Score (PECS).

Example #1 (without weights)

| Candidate | SES | PECS | CVS | SPD | Probability of Hiring |
|---|---|---|---|---|---|
| A | 62 | 54 | 72 | 76 | 66 |
| B | 65 | 92 | 85 | 72 | 78.5 |
| C | 99 | 50 | 97 | 78 | 81 |

Example #2 (with weights)

| Candidate | SES (15%) | PECS (50%) | CVS (20%) | SPD (15%) | Probability of Hiring |
|---|---|---|---|---|---|
| A | 62 | 54 | 72 | 76 | 62 |
| B | 65 | 92 | 85 | 72 | 84 |
| C | 99 | 50 | 97 | 78 | 71 |

In addition, time to fill a position by a candidate is also based on one or more parameters 222 including location, salary, and skill set. All positions may not have the exact same requirements. Thus, time to fill is to be calculated by analyzing similar position profiles that influence market data. The tracker module 108 is configured to analyze a set of similarities rules based on a plurality of dimensions including location of similar job positions within a predefined radius of a particular area; salary range for positions with a salary ranging from −25% to +25%; and required skills that may be assessed to fill the job positions with 75%+ of the same skill.

Figure 3:
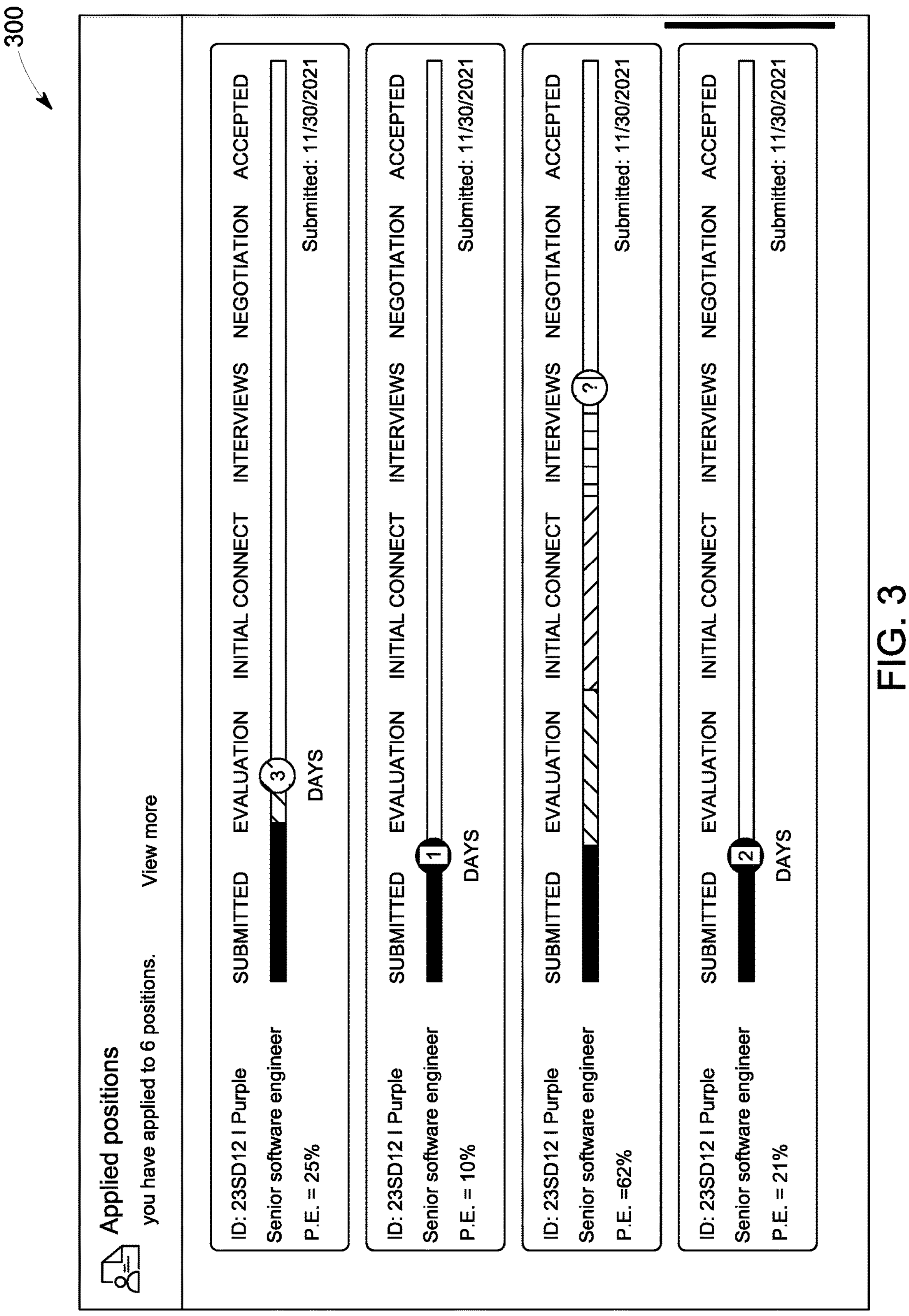
FIG. 3 illustrates a scenario where a candidate has applied to multiple jobs and receives different statuses across each job, according to an exemplary embodiment of the present invention disclosure.

FIG. 3 illustrates a scenario 300 where a candidate has applied to multiple jobs and receives different statuses across each job, according to an exemplary embodiment of the present invention disclosure. The recruiters as well as job seekers are able to track the status of any given job applications in real time by using the tracker module 108. As mentioned earlier, the tracker module 108 operates on multiple levels including: candidate, position member, position level, including position health score. The candidate level of the tracker module 108 provides visibility into the progress of the candidate's application within a specific position. Various data calculations on the likelihood of being hired for a given job position are performed automatically by the tracker module 108. Based on the tracker module 108 calculations, the user interface communicates the possibility of a candidate moving forward in the application process along with the reasoning behind the specific status changes. In an event, any candidate is not hired, the tracker module 108 displays via the electronic device, the general reasoning for rejection and prompts the candidate to apply to similar positions.

The tracker module 108 is thus configured to guarantee the candidate receives timely follow-up and activity regarding each application of each candidate. The goal of the tracker module 108 at the position member level, is to give the candidate enough information to make reasonable decisions to manage their career without having to rely on the recruiter, hiring manager, or other company representative to provide critical information.

The tracker module 108 is also configured to discourage hiring and recruiting representatives from abandoning or ignoring their pool of candidates by providing data the candidate needs to determine if they should stay in the candidate pool or maintain hope or interest that they may or may not be hired for the position. This facilitates in providing a self-service model for the job seeker, so they are not required to rely on the feedback loops that traditionally come from the recruiters or hiring managers.

The tracker module 108 is configured to provide predetermined, generic feedback to help the candidates to grow as a professional and to discourage the market trend of 'ghosting candidates' on their job status. For example, the feedback loop as part of a rejection letter based on the scores in the above Example #1 and Example #2, 'Candidate C' has a high SES but a very low PECS. 'Candidate C' is rejected for corresponding low PECS, because a low PECS score has historically been a reason to not give valuable, actionable feedback to the candidate. Accordingly, Candidate C would receive legally compliant feedback from the tracker module 108. Such rejection feedbacks may be the actionable to help the candidates to improve their skills while not creating an issue of legal liability for the hiring company due to human error that may have occurred.

Further, as mentioned earlier, a smart search engine powered by machine learning, may be configured to search for potential jobs for the candidate based on the assigned skill set. The smart engine may be configured to be used as a tool to calculate and express (in percentages) to determine how likely a candidate is to move forward in an application or be hired.

In another scenario, where a candidate enters desired compensation that exceeds the acceptable CVS, then based on the scores in the Example #1 and Example #2, the candidate may be asked to lower their compensation or withdraw their candidacy. Such feedback, when triggered by the tracker module 108, facilitates the candidates to save time and money for both the company and the candidate.

Figure 4:
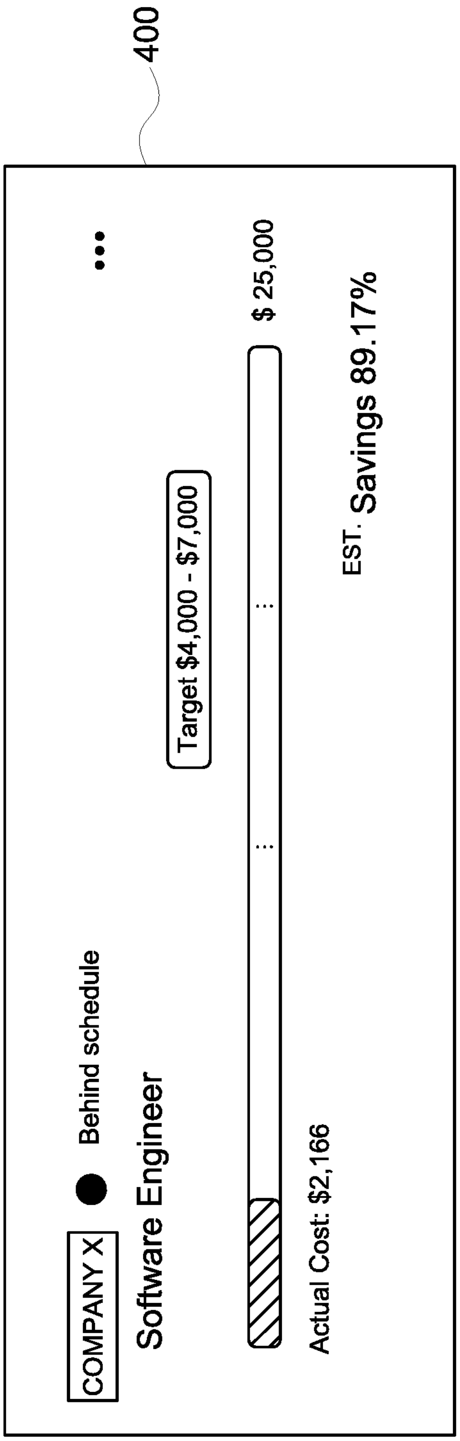
FIG. 4 illustrates a scenario displaying position health score, according to an exemplary embodiment of the present invention disclosure.

FIG. 4 illustrates a scenario displaying position health score, 400 according to an exemplary embodiment of the present invention disclosure. The tracker module 108 is further configured to establish a feedback loop for the hiring manager, based on their engagement with the platform and candidate feedback. The calculations based on negative feedback for a non-fit candidate provides ongoing insights for recruiters and candidates, encouraging appropriate candidates to apply and progress through the system.

The feedback for the position varies depending on the user permissions of the position data. The position health score provides general feedback to position and company stakeholders on the status of an open position compared to other 'similar position comparisons' (SPC). This may give the stakeholders feedback to understand if the role is 'ahead of schedule', 'on-time', or 'behind schedule' as it compares the market data with SPCs.

Figure 5:
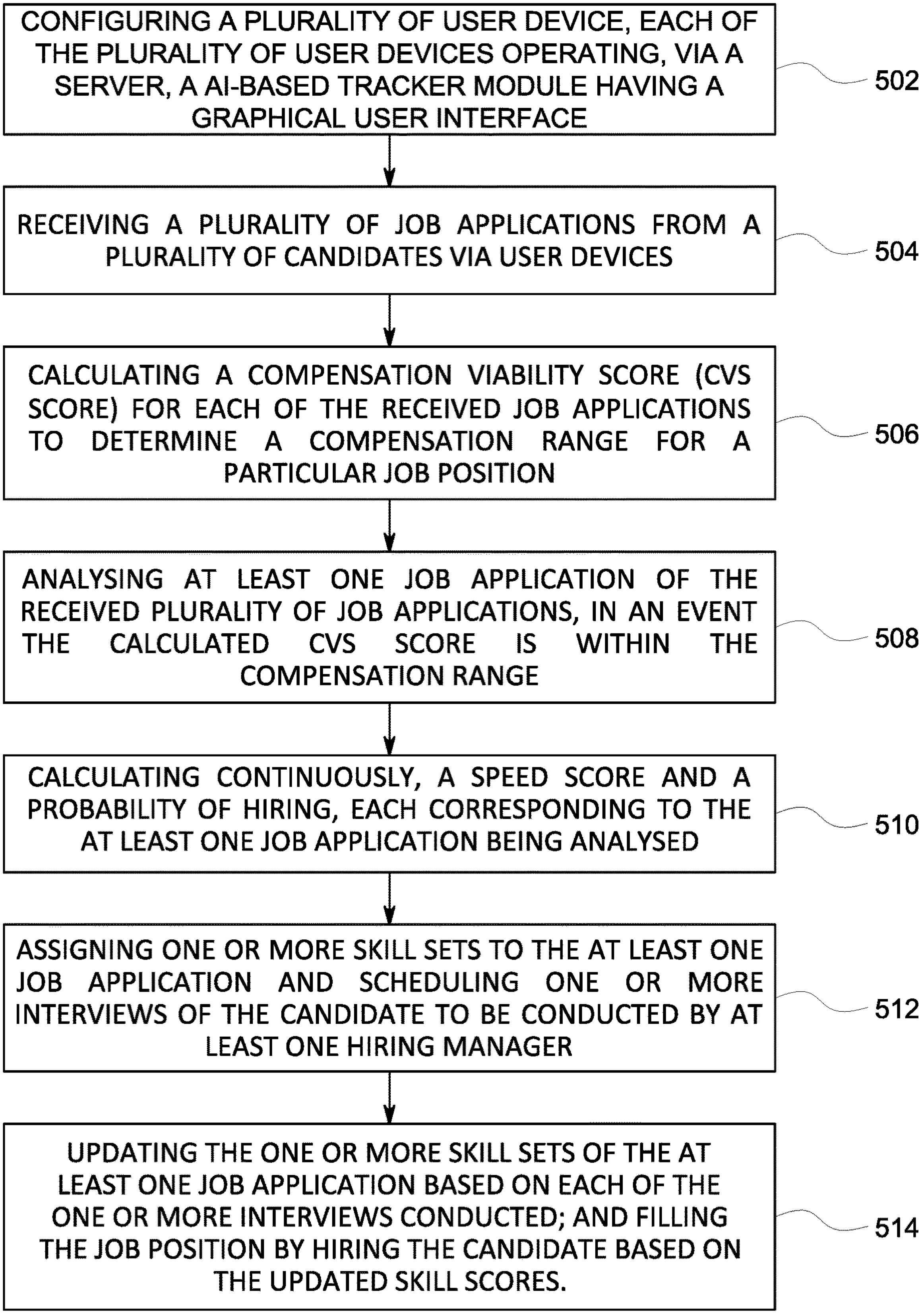
FIG. 5 illustrates the method for providing an Artificial Intelligence (AI) based recruitment management, according to an exemplary embodiment of the present invention disclosure.

FIG. 5 illustrates the method for providing an Artificial Intelligence (AI) based recruitment management, according to an exemplary embodiment of the present invention disclosure.

At step 502, a plurality of user devices 102 is configured. Each of the plurality of user devices 102 operates, via a server 106, an AI-based tracker module 108 having a graphical user interface. The AI-based tracker module 108 is further configured to send an automated email to the candidate in an event of job application rejection. Further, a data repository 112 may be configured to store user profile data, job profile data and industry profile data along with other information and data relevant to the hiring management processes.

At step 504, a plurality of job applications is received from a plurality of candidates via respective user devices 102.

At step 506, a compensation viability score (CVS score) is calculated for each of the received job applications to determine a compensation range for a particular job position. The compensation viability score (CVS) is calculated based on the candidate's indicated salary.

At step 508, at least one job application of the received plurality of job applications is analysed in an event, when the calculated CVS score is within the compensation range.

At step 510, a speed score and a probability of hiring is calculated continuously. The speed score corresponds to the at least one job application being analysed. The probability of hiring a candidate by calculating an average of a sum of SES, PECS, CVS and SPD. The probability of hiring a candidate is also based on corresponding wights assigned against each of the SES, PECS, CVS and SPD by the at least one hiring manager. The different weights may be assigned depending upon the importance or priority as set by the hiring manager.

At step 512, one or more skill sets is assigned to the at least one job application being analysed, and one or more interviews of the candidate is scheduled to be conducted by at least one hiring manager. A smart search engine powered by machine learning may also be configured to search for potential jobs for the candidate based on the assigned skill set. The one or more skill sets include a skilled and experience score (SES), and a people, ethics & culture soft skills (PECS).

According to an embodiment of the present disclosure, the tracker module 108 is further configured to calculate the SES score by obtaining the highest salary expectation match among all active candidates and calculate the distance between the candidate and the highest salary expectation match. Further, the tracker module 108 is configured to calculate the PECS score, by getting highest PECS match, among all active candidates and calculate the distance between the candidate and highest PECS match. The tracker module 108 is further configured to calculate the speed score (SPD) that measures the movement speed with which the candidate moves from one designation phase to another. A higher speed score may be assigned to the candidate, in the event the candidate moves faster than other candidates.

At step 514, the one or more skill sets of the at least one job application are updated based on each of the one or more interviews conducted and accordingly, the job position is filled by hiring the candidate based on the updated skill scores. The time to fill a position by a candidate is determined based on one or more parameters including location, salary, and skill set.

It will be understood by those skilled in the art that the figures are only a representation of the structural components and process steps that are deployed to provide an environment for the solution of the present invention disclosure discussed above, and does not constitute any limitation. The specific components and method steps may include various other combinations and arrangements than those shown in the figures.

The term exemplary is used herein to mean serving as an example. Any embodiment or implementation described as exemplary is not necessarily to be construed as preferred or advantageous over other embodiments or implementations. Further, the use of terms such as including, comprising, having, containing and variations thereof, is meant to encompass the items/components/process listed thereafter and equivalents thereof as well as additional items/components/process.

Although the subject matter is described in language specific to structural features and/or acts, it is to be understood that the subject matter defined in the claims is not necessarily limited to the specific features or process as described above. In fact, the specific features and acts described above are disclosed as mere examples of implementing the claims and other equivalent features and processes which are intended to be within the scope of the claims.

What claimed is:

1. A system for providing artificial intelligence (AI)-based recruitment management, the system comprising:
- a plurality of user devices, each of the plurality of user devices operating, via a server, an AI-based tracker module having a graphical user interface and a machine learning engine, configured to:
  - receive a plurality of job applications from a plurality of candidates via respective user devices;
  - calculate a compensation viability score (CVS) for each of the received job applications to determine a compensation range for a particular job position, wherein the CVS is calculated using a normalization algorithm based on candidate-provided salary expectations and stored market compensation data;
  - analyse at least one job application of the received plurality of job applications, in an event the calculated CVS-is within the compensation range;
  - for the at least one analyzed job application, apply a trained machine learning model to generate a speed score (SPD score) associated with candidate phase transitions and historical application processing times for similar positions, and dynamic candidate metrics;
  - assign one or more skill set scores to the at least one job application being analysed;

schedule one or more interviews of a candidate of the plurality of candidates to be conducted by at least one hiring manager;

update the one or more skill set scores of the at least one job application based on each of the one or more interviews conducted, wherein the one or more skill set scores include:

a skilled and experience score (SES) calculated by obtaining the highest salary expectation match among all active candidates and calculating a distance between the candidate and the highest salary expectation match; and a people, ethics & culture soft skills (PECS) score calculated by getting highest PECS match, among all active candidates and calculating a distance between the candidate and highest PECS match;

fill the job position by hiring the candidate based on corresponding updated skill set scores and the calculated probability of hiring; and updating the trained machine learning model based on changes in the skill set scores, the speed score, and metrics derived from hiring for previously analyzed job applications, wherein updating the trained machine learning model comprises refining predictive accuracy of the machine learning model by comparing outcomes of previously analyzed job applications against baseline data generated from Similar Position Comparisons (SPCs) based on job variables including at least the SES, CVS, and geographical location, thereby improving a prediction of hiring for subsequently received job applications over a period of time without requiring manual recalibration of the machine learning.

2. The system of claim 1, further comprising a smart search engine powered by machine learning, the smart search engine configured to search for potential jobs for the candidate based on the assigned skill set.

3. The system of claim 1, further comprising a data repository configured to store user profile data, job profile data and industry profile data.

4. The system of claim 1, wherein the AI-based tracker module is further configured to send an automated email to the candidate in an event of rejection.

5. The system of claim 1, wherein the CVS is calculated based on the candidate's indicated salary.

6. The system of claim 1, wherein the AI-based tracker module is further configured to assign a higher speed score to the candidate, in the event the candidate moves faster than other candidates.

7. The system of claim 1, wherein the AI-based tracker module is configured to determine the probability of hiring a candidate by calculating an average of a sum of the SES, the PECS score, the CVS and the SPD score.

8. The system of claim 1, wherein the AI-based tracker module is configured to determine the probability of hiring a candidate based on corresponding weights assigned against each of the the PECS score, the CVS and the SPD score by the at least one hiring manager.

9. The system of claim 1, wherein the AI-based tracker module is configured to predict time to fill a position by a candidate, based on one or more parameters including location, salary, and skill set.

10. A method for providing Artificial Intelligence (AI) based recruitment management, the method comprising:

configuring a plurality of user devices, each of the plurality of user devices operating, via a server, an AI-based tracker module having a graphical user interface and a machine learning engine configured for:

receiving a plurality of job applications from a plurality of candidates via respective user devices;

calculating a compensation viability score (CVS) for each of the received job applications to determine a compensation range for a particular job position, wherein the CVS is calculated using a normalization algorithm based on candidate-provided salary expectations and stored market compensation data;

analyzing at least one job application of the received plurality of job applications, in an event the calculated CVS score is within the compensation range;

for the at least one analyzed job application, applying a trained machine learning model to generate a speed score (SPD score) associated with candidate phase transitions and historical application processing times for similar positions, and dynamic candidate metrics;

assigning one or more skill set scores to the at least one job application being analyzed;

scheduling one or more interviews of a candidate of the plurality of candidates to be conducted by at least one hiring manager; and updating the one or more skill set scores of the at least one job application based on each of the one or more interviews conducted, wherein the one or more skill set scores include:

a skilled and experience score (SES) calculated by obtaining the highest salary expectation match among all active candidates and calculating a distance between the candidate and the highest salary expectation match; and a people, ethics & culture soft skills (PECS) score calculated by getting highest PECS match, among all active candidates and calculating a distance between the candidate and highest PECS match;

filling the job position by hiring the candidate based on the updated skill set scores and the calculated probability of hiring; and updating the trained machine learning model based on changes in the skill set scores, the speed score, and metrics associated with hiring for previously analyzed job applications, wherein updating the trained machine learning model comprises refining predictive accuracy of the machine learning model by comparing outcomes of previously analyzed job applications against baseline data generated from Similar Position Comparisons (SPCs) based on job variables including at least the SES, CVS, and geographical location, thereby improving a prediction of hiring for subsequently received job applications over a period of time without requiring manual recalibration of the machine learning model.

11. The method of claim 10, further comprising a smart search engine powered by machine learning, the smart search engine configured to search for potential jobs for the candidate based on the assigned skill set.

12. The method of claim 10, further comprising a data repository configured to store user profile data, job profile data and industry profile data.

13. The method of claim 10, wherein the AI-based tracker module is further configured to send an automated email to the candidate in an event of rejection.

14. The method of claim 10, wherein CVS is calculated based on the candidate's indicated salary.

* * * * *